(12) United States Patent  (10) Patent No.: US 8,909,834 B2
Deb et al.  (45) Date of Patent: Dec. 9, 2014

(54) CENTRAL BUS GUARDIAN (CBG) AND METHOD FOR OPERATING CBG

(75) Inventors: Abhijit Kumar Deb, Eindhoven (NL); Hubertus Gerardus Hendrikus Vermeulen, Eindhoven (NL); Sujan Pandey, Eindhoven (NL)

(73) Assignee: NXP B.V., Eindhoven (NL)

( * ) Notice: Subject to any disclaimer, the term of this patent is extended or adjusted under 35 U.S.C. 154(b) by 696 days.

(21) Appl. No.: 13/238,742

(22) Filed: Sep. 21, 2011

(65) Prior Publication Data

US 2013/0073764 A1  Mar. 21, 2013

(51) Int. Cl.
*G06F 13/36* (2006.01)
*H04L 12/66* (2006.01)

(52) U.S. Cl.
CPC ..................................... *H04L 12/66* (2013.01)
USPC .......................................... 710/117; 710/244

(58) Field of Classification Search
CPC ............................... G06F 13/36; G06F 13/372
USPC ......... 710/113, 114, 117, 124, 305, 240, 244; 370/442, 461
See application file for complete search history.

(56) References Cited

U.S. PATENT DOCUMENTS

| 5,706,278 | A  | * | 1/1998  | Robillard et al. | 370/222 |
| 8,265,100 | B2 | * | 9/2012  | Steiner et al.   | 370/503 |
| 2005/0129055 | A1 | * | 6/2005  | Hall et al.   | 370/461 |
| 2005/0135404 | A1 | * | 6/2005  | Zumsteg et al. | 370/442 |
| 2007/0081548 | A1 | * | 4/2007  | Jiang          | 370/442 |
| 2009/0213870 | A1 | * | 8/2009  | Terasawa et al. | 370/442 |
| 2009/0262649 | A1 | * | 10/2009 | Zinke et al.   | 370/242 |
| 2010/0020828 | A1 | * | 1/2010  | Angelow        | 370/498 |
| 2010/0064082 | A1 | * | 3/2010  | Ihle et al.    | 710/106 |
| 2011/0103390 | A1 | * | 5/2011  | Hall et al.    | 370/400 |

FOREIGN PATENT DOCUMENTS

EP  2178257 A1  4/2010

OTHER PUBLICATIONS

Milbredt, P. et al. "Switched FlexRay: Increasing the Effective Bandwidth and Safety of FlexRay Networks," IEEE Conf. on Emerging Technologies and Factory Automation, 8 pgs. (Sep. 2010).

Extended European Search Report for European Patent Appln. No. 12181324.0 (Mar. 21, 2013).

FlexRay Communications System Protocol Specification, ver 2.1, Rev E, FlexRay consortium, [Online], http://www.flexray.com (as of Dec. 22, 2010).

FlexRay Communications System Preliminary Central Bus Guardian Specification, ver 2.0.9, FlexRay consortium, [Online], http://www.flexray.com (as of Dec. 22, 2010).

CAN specification, Robert Bosch GmbH, Ver 2.0, 1991.

LIN specification package, LIN Consortium, Rev 2.1, Nov. 2006.

* cited by examiner

*Primary Examiner* — Khanh Dang (57) ABSTRACT

Central bus guardians (CBGs) and methods for operating a CBG are described. In one embodiment, a method for operating a CBG includes performing race arbitration among the buses connected to the CBG to select a winner bus for a time slot, and selectively forwarding data received at the CBG from the winner bus to a destination bus in the time slot based on whether the winner bus or the destination bus has a connection to an external network with respect to the application network and whether a communications device connected to the winner bus or the destination bus performs a critical function. Other embodiments are also described.

17 Claims, 4 Drawing Sheets

CENTRAL BUS GUARDIAN (CBG) AND METHOD FOR OPERATING CBG

Embodiments of the invention relate generally to systems and methods for operating an electronic system and, more particularly, to Central Bus Guardians (CBGs), In-Vehicle Network (IVN) systems equipped with CBGs, and methods for operating a CBG.

A CBG is a communications hub device that can be used to improve the robustness of data communications. To improve the robustness of data communications, a CBG looks for anomalies in buses that are connected to the CBG. Traditionally, a CBG works in a reactive manner by reacting to any visible anomaly through blocking an anomalous signal such that the anomalous signal does not propagate to other buses. A CBG can connect communications nodes in an automobile system to improve the robustness of critical communications of the automobile system. In addition to the communications nodes in the automobile system, the CBG can connect to external communications nodes. However, an intruder may exploit the communications connections between a CBG and the external communications nodes for malicious activities. For example, an intruder may listen to ongoing network communications of the communications nodes in the automobile system to gain knowledge of the network operation in the automobile system. In addition, an intruder may send wrong data to the CBG to disrupt ongoing communications of the communications nodes in the automobile system or cause malfunction of the CBG and/or the communications nodes in the automobile system. Malicious activities performed by the intruder may not cause any visible anomaly, and when an anomaly is visible, the damage has most likely already occurred.

CBGs and methods for operating a CBG are described. In one embodiment, a method for operating a CBG includes performing race arbitration among the buses connected to the CBG to select a winner bus for a time slot, and selectively forwarding data received at the CBG from the winner bus to a destination bus in the time slot based on whether the winner bus or the destination bus has a connection to an external network with respect to the application network and whether a communications device connected to the winner bus or the destination bus performs a critical function. Other embodiments are also described.

In an embodiment, a CBG includes an input/output (I/O) unit connected to buses in an application network, and a processing unit configured to perform race arbitration among the buses connected to the CBG to select a winner bus for a time slot, the processing unit being further configured to selectively forward data received at the CBG from the winner bus to a destination bus in the time slot based on whether the winner bus or the destination bus has a connection to an external network with respect to the application network and whether a communications device connected to the winner bus or the destination bus performs a critical function.

In an embodiment, a method for operating a FlexRay-compatible CBG that is connected to buses in an application network includes performing race arbitration among the buses connected to the FlexRay-compatible CBG to select a winner bus for a time slot and selectively forwarding data received at the FlexRay-compatible CBG from the winner bus to a destination bus in the time slot based on whether the winner bus or the destination bus has a connection to an external network with respect to the application network and whether a communications device connected to the winner bus or the destination bus performs a critical function.

Other aspects and advantages of embodiments of the present invention will become apparent from the following detailed description, taken in conjunction with the accompanying drawings, depicted by way of example of the principles of the invention.

Throughout the description, similar reference numbers may be used to identify similar elements.

It will be readily understood that the components of the embodiments as generally described herein and illustrated in the appended figures could be arranged and designed in a wide variety of different configurations. Thus, the following detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment. Rather, language referring to the features and advantages is understood to mean that a specific feature, advantage, or characteristic described in connection with an embodiment is included in at least one embodiment. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment. Thus, the phrases "in one embodiment," "in an embodiment," and similar language throughout this specification may, but do not necessarily, all refer to the same embodiment.

Figure 1:
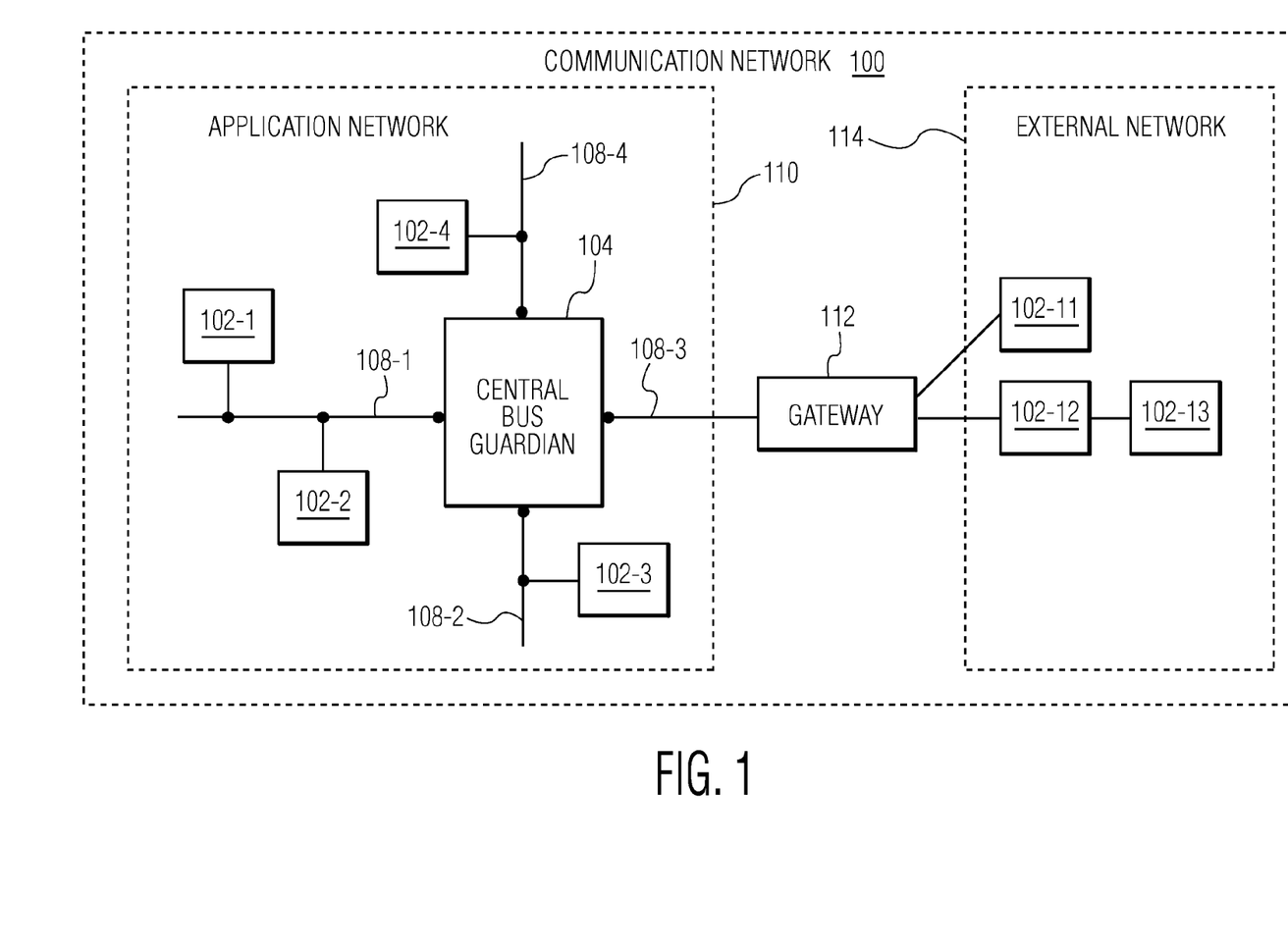
FIG. 1 is a schematic block diagram of a communications network in accordance with an embodiment of the invention.

FIG. 1 is a schematic block diagram of a communications network 100 in accordance with an embodiment of the invention. The communications network can be used for various applications. In the embodiment depicted in FIG. 1, the communications network 100 includes an application network 110, a gateway 112 and an external network 114.

The application network 110 is configured to facilitate communications among communications devices in an application system. In an embodiment, the application network 110 facilitates critical (e.g., safety critical) communications among the communications devices in the application system. The application network 110 can be used for various applications. In an embodiment, the application network 110 is used for at least one automotive application. Examples of automotive applications includes, without limitation, vehicle dynamics such as braking, suspension, steering, driver assistance, intelligent parking assist, adaptive cruise control, fuel control, traction control, intelligent power assisted steering, lane departure warning, electronic power assisted steering and electronic stability control. For example, the application network 110 facilitates communications among communications devices such as electronic controller nodes in an automobile system within a vehicle.

In the embodiment depicted in FIG. 1, the application network 110 includes communications devices 102-1, 102-2, 102-3, 102-4 and a CBG 104. Although the application network 110 is shown in FIG. 1 as including four communications devices, in some other embodiments, the application network 110 includes more than four communications devices or less than four communications devices. In addition, although the application network 110 is shown in FIG. 1 as including only one CBG 104, in some other embodiments, the application network 110 includes multiple CBGs.

The communications devices 102-1, 102-2, 102-3, 102-4 of the application network 110 are configured to transmit and receive data. The data transmitted and received by the communications devices can be in any suitable format. In an embodiment, the data transmitted and received are data frames. In an embodiment, a data frame includes a header segment, a payload segment used to convey application data, and a trailer segment. In addition to communications, each of the communications devices may be configured to perform an additional function. For example, each of the communications devices may be used to perform an automotive application. In an embodiment, the communications devices are electronic controller nodes in an automobile system. An electronic controller node may contain an electronic control unit (ECU), to which sensors and actuators are connected. The ECU typically collects data from the sensors, runs an application software, controls the actuators, and communicates to other electronic controller nodes via the communications network.

In an embodiment, at least one of the communications devices 102-1, 102-2, 102-3, 102-4 of the application network 110 performs a critical function of an application system. A critical function of an application system may be a function that is related to the safety of the application system. For an automobile system, critical functions may be the functions that are related to the safety of a vehicle. Examples of the critical functions of a vehicle include engine control, traction control, airbag control, brake-by-wire, steer-by-wire, etc., which are related to the safety of the vehicle. In an embodiment, at least one of the communications devices 102-1, 102-2, 102-3, 102-4 of the application network 110 performs a non-critical function of an application system. A non-critical function of an application system may be a function that is not related to the safety of the application system. For an automobile system, non-critical functions may be the functions that are not related to the safety of a vehicle. Examples of the non-critical functions of a vehicle include multimedia and gaming that are related to entertainment; and window control and climate control that are related to comfort.

The CBG 104 of the application network 110 is configured to selectively block and selectively forward data received on buses/branches in the application network 110 that are connected to the CBG 104. In the embodiment depicted in FIG. 1, the CBG 104 is connected to four buses 108-1, 108-2, 108-3, 108-4 in the application network 110. Specifically, the communications devices 102-1, 102-2 are connected to the bus 108-1, the communications device 102-3 is connected to the bus 108-2, the gateway 112 is connected to the bus 108-3, and the communications device 102-4 is connected to the bus 108-4. In an embodiment, the four buses 108-1, 108-2, 108-3, 108-4 are serial communications buses in the application network 110. The CBG 104 may be a part of an In-Vehicle Network (IVN) system. Although the CBG 104 is shown in FIG. 1 as being connected to four buses, in some other embodiments, the CBG 104 is connected to more than four buses or less than four buses. In an embodiment, at least one of the communications devices 102-1, 102-2, 102-3, 102-4 is directly connected to a bus in the application network 110. In other words, at least one of the communications devices 102-1, 102-2, 102-3, 102-4 is connected to a bus in the application network 110 without any intermediate device.

The robustness of critical (e.g., safety critical) communications of an application system such as an automobile system can be improved by connecting communications devices 102-1, 102-2, 102-3, 102-4 in the application system to the CBG 104. For example, the CBG 104 can block unwanted communications in the automobile system and protect the critical communications. In an embodiment, all of the communications devices 102-1, 102-2, 102-3, 102-4 are communications nodes of a FlexRay™ communications system in accordance to the FlexRay™ communications system specifications developed by the FlexRay™ Consortium. A FlexRay™ communications system is a robust, scalable, deterministic and fault-tolerant serial bus system for automotive applications. In this embodiment, the CBG 104 is connected to a channel of the FlexRay™ communications system to enable data transfer on the channel and to increase fault tolerance. A channel of the FlexRay™ communications system is a single communications medium, e.g., one network. For example, the FlexRay™ communications system specifications distinguish between two independent, parallel communications media, a channel A and a channel B. The CBG 104 may be a FlexRay-compatible CBG, which is designed, developed, manufactured, and/or configured compatibly with or in accordance to the FlexRay™ communications system specifications developed by the FlexRay™ Consortium. The four buses 108-1, 108-2, 108-3, 108-4 are FlexRay-compatible communications buses. When the CBG 104 is used to protect a channel of a FlexRay™ communications system, some critical faults (e.g., short circuited bus lines or erroneous behavior of a communications node) can be tolerated by the FlexRay™ communications system. The CBG 104 can support a given number (e.g., 16) of buses/branches in the application network 110. In an embodiment, a sub-bus or other communications link/device is connected to a bus in the application network 110 and communications nodes that perform non-critical applications are connected to the sub-bus or the other communications link/device. For example, a gateway or a bridge can be used to connect the CBG 104 to a Local Interconnect Network (LIN) bus, a Controller Area Network (CAN) bus, or an Ethernet bus, which is connected to external communications devices. The LIN bus is a vehicle bus or a computer networking bus system used within automotive network architectures. The CAN bus is a vehicle bus designed to allow microcontrollers and devices to communicate with each other within a vehicle without a host computer. The number of nodes connected to a sub-bus is not limited by the CBG 104. The architecture and algorithms of the CBG 104 may be independent of the number of buses connected to the CBG 104. In an embodiment, multiple CBGs are cascaded on one channel of a FlexRay™ communications system. For example, if a single CBG does not have a sufficient number of buses/branches for a certain FlexRay™ communications system, multiple CBGs can be cascaded on one channel of the FlexRay™ communications system such that a sufficient number of buses/branches are achieved.

In an embodiment, the CBG 104 is further configured to store a communications schedule of the communications devices 102-1, 102-2, 102-3, 102-4 and configuration parameters. The communications schedule contains information of scheduled data traffic that goes through the CBG 104. The CBG 104 selectively blocks and selectively forwards data received on the buses 108-1, 108-2, 108-3, 108-4 connected to the CBG 104 based on the communications schedule and/or the configuration parameters. The CBG 104 at least stores bus level communications schedule of data communications that goes through the CBG. The CBG 104 may not store the complete communications schedule of the communications network 100. However, the CBG 104 may also store more information, e.g., node level communications schedule, of data communications that goes through the CBG 104. In an embodiment, the CBG 104 has information to protect data (e.g., a data frame or data frames) relevant to critical functions and to start up and maintain communications. In an embodiment, if only a subset of the communications devices and messages are used to fulfill a critical function, only the schedule of the subset of the communications devices and messages is stored in the CBG 104 and only the time slot/bus combinations of the subset of the communications devices and messages are protected. A time slot may be a slot in a static segment of a FlexRay-compatible communications cycle or a mini-slot in a dynamic segment of a FlexRay-compatible communications cycle. As a result, a change in a communications device performing a non-critical function will not lead to a change in the communications schedule stored in the CBG 104.

In an embodiment, the CBG 104 is configured to decode data (e.g., a data frame or data frames). The CBG 104 can filter received data frames. Examples of filtering functions that can be performed by the CBG 104 includes, without limitation, semantic filtering and Byzantine (SOS) filtering. By filtering received data frames, the CBG 104 operates to ensure that certain errors received on one bus will not propagate to other buses. Because the CBG 104 is separated from the communications devices 102-1, 102-2, 102-3, 102-4, errors in the communications devices will not harm the CBG 104. Data such as a data frame that is identified as faulty by the CBG 104 will be invalidated in such a way that all of the communications devices will detect the data as being faulty. The CBG 104 can prevent the formation of cliques on one channel during startup and normal operation by not-forwarding or invalidating frames which are identified as faulty (e.g., with wrong frame ID or cycle count). The CBG 104 can protect the startup of a FlexRay™ communications system in the presence of faults. For example, the CBG 104 can prevent the "endless startup scenario" caused by a resetting leading coldstart communications device. In addition, the CBG 104 can significantly enhance the fault tolerance of the FlexRay™ system especially during startup. For example, the CBG 104 can limit the bandwidth assigned to a certain communications device or a bus connected to the CBG 104.

In addition to the communications devices 102-1, 102-2, 102-3, 102-4 in the application network 110, the CBG 104 connects to one or more external communications devices via the gateway 112. The gateway is configured to translate data communications between different networks. In an embodiment, the communications devices in the application network 110 are considered as internal nodes of the application network 110 while a communications device that is located outside of the application network 110 is considered as an external node to the application network 110. In a case that the application network 110 is a FlexRay™ communications system, the communications devices in the application network 110 are considered as internal nodes of the FlexRay™ communications system while a communications device that is located outside of the FlexRay™ communications system is considered as an external node of the FlexRay™ communications system. An external node of the application network 110 may be physically located in the same apparatus as the internal nodes of the application network 110 or located outside of the apparatus. For example, an external node of the application network 110 may be physically located in the same vehicle as the internal nodes of the application network 110 or located outside of the vehicle. Because an external node is not a part of the application network 110, the external node has no direct connection to the CBG 104. In the embodiment depicted in FIG. 1, the CBG 104 connects to the external network 114 via the gateway 112 at the bus 108-3. The gateway is configured to translate data communications between the application network 110 and the external network. In the embodiment depicted in FIG. 1, the application network 110 and the external network communicate using different protocols. For example, communications devices in the application network 110 may communicate in accordance to the FlexRay™ communications system specifications developed by the FlexRay™ Consortium and communications devices in the external network may communicate using another protocol such as CAN, LIN, or Ethernet. The CBG 104 does not directly know that a particular bus connected to the CBG 104 is linked to an external node. However, because an external node may access the application network 110 only via the gateway, the bus connected to the CBG 104 that leads to the gateway is the bus that may be connected to the external node.

In the embodiment depicted in FIG. 1, the external network 114 includes communications devices 102-11, 102-12, 102-13. The communications devices 102-11, 102-12 are directly connected to the gateway 112 while the communications device 102-13 is connected to the gateway via the communications device 102-12, which acts as a network router. The communications devices 102-11, 102-12, 102-13 of the external network are configured to transmit and receive data synchronously and/or asynchronously. The data transmitted and received by the communications devices 102-11, 102-12, 102-13 can be in any suitable format. In an embodiment, the data transmitted and received are data frames. In addition to communications, each of the communications devices 102-11, 102-12, 102-13 may be configured to perform an additional function. For example, each of the communications devices 102-11, 102-12, 102-13 may be used to perform an automotive application. In an embodiment, the communications devices 102-11, 102-12, 102-13 are electronic controller nodes in an automobile system. Although the external network is shown in FIG. 1 as including three communications devices 102-11, 102-12, 102-13, in some other embodiments, the external network includes more than three communications devices or less than three communications devices. In addition, although the external network is shown in FIG. 1 as including two communications devices that are directly connected to the gateway and one communications device that is indirectly connected to the gateway, in some other embodiments, the external network includes any number of communications devices that are directly connected to the gateway and any number of communications devices that are indirectly connected to the gateway.

The CBG 104 uses scheduling information (e.g., a communications schedule) to route data (e.g. data frames) from one bus 108-1, 108-2, 108-3, or 108-4 to another bus or multiple buses. The available scheduling information for different communications time slots may contain different levels of details. For example, for some communications time slots, the sender bus (i.e., the bus via which a sender device is connected to the CBG 104) may be specified in the communications schedule. However, for some other communications time slots, the sender bus may not be specified in the communications schedule. If the sender bus is specified in the communications schedule, the CBG 104 performs a strict arbitration. As a result, the data frame from the specified sender bus is forwarded to the specified destination bus or buses. If the sender bus is not specified in the communications schedule, the CBG 104 performs a race arbitration process among the available buses and may select the bus that first begins to send data (e.g., a data frame) during a particular time slot as the winner of the race arbitration of the particular time slot. For example, the CBG 104 may select the bus from which that data (e.g., a data frame) is first received during a particular time slot as the winner of the race arbitration of the particular time slot. When the winner bus is detected, data transmission from other buses is blocked by the CBG 104 in the particular time slot. The winner bus is allowed to use the complete time slot and data (e.g., a data frame or data frames) from the winner bus is forwarded to the other buses by the CBG 104. However, hackers can potentially perform unwarranted communications during a time slot in which race arbitration is performed. An intruder may exploit the communications connections between the CBG 104 and communications nodes 102-11, 102-12, 102-13 of the external network 114 for malicious activities against the communications devices 102-1, 102-2, 102-3, 102-4 of the application network 110. For example, an intruder may listen to ongoing network communications of the communications devices 102-1, 102-2, 102-3, 102-4 of the application network 110 to gain knowledge of the network operation in the application network 110. In addition, an intruder may send data at wrong moments to disrupt ongoing communications of the communications devices 102-1, 102-2, 102-3, 102-4 of the application network 110. Furthermore, an intruder may send malicious data to cause malfunction of the CBG 104 and/or of the communications devices 102-1, 102-2, 102-3, 102-4 of the application network 110. For example, when one of the communications devices 102-11, 102-12, 102-13 in the external network is connected to the Internet, a hacker can potentially access the communications devices 102-1, 102-2, 102-3, 102-4 of the application network 110 via the external network. The malicious activities performed by a hacker pose a risk to the safety of the application network 110. For example, a hacker may send a command to electronic controllers that control airbags of a vehicle to inflate the airbags while the vehicle is being driven in a highway, which could potentially cause an accident.

In the embodiment depicted in FIG. 1, the CBG 104 takes pro-active actions to protect the internal nodes in the application network 110 from getting exposed to the external nodes in the external network in an unwarranted way, by means of selective forwarding and blocking of data frames to/from external node or nodes, as described in detail below. Therefore, the CBG 104 protects the internal nodes in the application network 110 from possible malicious activities from the external nodes in the external network and improves the security of the application network 110, which may be, for example, a FlexRay™ system.

The CBG 104 uses a filtering mechanism to restrict the data forwarding and receiving behavior to/from a bus with an external connection. This filtering mechanism may generate additional input and output masks to implement additional forwarding and blocking rules in addition to the input and output masks used to implement regular data communications behavior. The additional forwarding and blocking rules can be implemented to improve the network security. For example, the additional forwarding and blocking rules can make the network system more robust and secure against the possible malicious activities that can take place during the race arbitration process.

In the embodiment depicted in FIG. 1, the CBG 104 takes pro-active actions to restrict the network access of the bus 108-3, which has a connection to the external network 114. The CBG 104 can prevent unwarranted listening of ongoing network communications of the application network 110 by an external node such that the network operation of the application network 110 is not revealed to the external world. In addition, the CBG 104 can prevent unscheduled frame transmission by an external node with malicious data such that the network operation of the application network 110 is not disrupted and the CBG 104 and/or the application network 110 do not malfunction in response to the malicious data.

In the embodiment depicted in FIG. 1, the CBG 104 is configured to restrict data delivery to the bus 108-3, which has a connection to the external network 114. The forwarding and blocking behavior of the CBG 104 is determined by the scheduling information that is available to the CBG 104. The available scheduling information for different communications slots may contain two different levels of details, which are discussed below.

When a sender bus is specified for a particular time slot in the CBG communications schedule, the CBG 104 performs strict arbitration and implements the data routing behavior specified in the communications schedule of the CBG 104 for the particular time slot. The CBG 104 forwards scheduled data (e.g., a scheduled data frame or scheduled data frames) from a bus 108-1, 108-2, 108-3, or 108-4 connected to the CBG 104 to another bus or buses connected to the CBG 104. In other words, the CBG 104 forwards scheduled data from a sender bus to at least one destination bus, where the sender bus and/or the at least one destination bus is specified in the communications schedule of the CBG 104. The communications schedule may specify a sender bus, a destination bus or destination buses, or a sender bus and a destination bus or destination buses. A sender bus or a destination bus specified in the communications schedule of the CBG 104 may be connected to the external world via a gateway device or a bridge device. Since the scheduled data is scheduled to be forwarded to the external world, the CBG 104 can forward scheduled data without incurring any unnecessary risk. In the embodiment depicted in FIG. 1, a sender bus or a destination bus specified in the communications schedule may be the bus 108-3, which is connected to the external world via the gateway 112. In this case, according to the communications schedule, the CBG 104 forwards scheduled data (e.g., a scheduled data frame or scheduled data frames) from a sender bus 108-1, 108-2, or 108-4 to the bus 108-3 or from the bus 108-3 to a destination bus 108-1, 108-2, or 108-4. For example, the communications schedule of the CBG 104 may specify "108-3→108-1" for a particular time slot, which means that at least one communications device 102-10, 102-11, or 102-12 of the external network 114 connected to the bus 108-3 is allowed to send data to the bus 108-1 via the CBG 104 in the particular time slot. In another example, the communications schedule of the CBG 104 may specify "108-3→108-1 and 108-2" for a particular time slot, which means that at least one communications device 102-10, 102-11, or 102-12 of the external network 114 connected to the bus 108-3 is allowed to send data to the buses 108-1 and 108-2 via the CBG 104 in the particular time slot. In another example, the communications schedule of the CBG 104 may specify "108-3→108-1, 108-2, and 108-4" for a particular time slot, which means that at least one communications device 102-10, 102-11, or 102-12 of the external network 114 connected to the bus 108-3 is allowed to send data to the buses 108-1, 108-2, and 108-4 via the CBG 104 in the particular time slot. In another example, the communications schedule of the CBG 104 may specify "108-1→108-2:108-3→108-4" for a particular time slot, which means that at least one communications device 102-10, 102-11, or 102-12 of the external network 114 connected to the bus 108-3 is allowed to send data to the bus 108-4 via the CBG 104 in the particular time slot and at least one communications device 102-1 or 102-2 is allowed to send data to the bus 108-2 via the CBG 104 in the particular time slot. When a sender bus is not specified or when multiple sender buses are specified for a particular time slot in the CBG communications schedule, the CBG 104 performs a race arbitration process among the available buses and specified buses, respectively, and may select the bus that first begins to send data (e.g., a data frame) during a particular time slot as the winner of the race arbitration of the particular time slot. For example, the communications schedule of the CBG 104 may specify "108-1, 108-2, 108-3, 108-4" for a particular time slot, which means that the winner of race arbitration from the buses 108-1, 108-2, 108-3, 108-4 is allowed to send data to another bus or other buses via the CBG 104 in the particular time slot. Instead of forwarding a received data frame from the winner bus to all other buses, the CBG 104 imposes a stricter forwarding and blocking policy, depending on what kind of bus wins the race arbitration and what kind of bus may receive the received data frame. The buses connected to the CBG 104 can be categorized into three types, which include "safety critical bus," "bus with an external node," and "non-safety critical bus," depending on what type of communications devices are connected to the buses. A safety critical bus is a bus that contains or leads to at least one communications device that performs a safety critical operation. A safety critical bus does not lead to any external communications devices. A bus with an external node is a bus that leads to at least one connection to the external world. A non-safety critical bus is a bus that contains or leads to no safety critical communications device and does not lead to any external communications device. The pro-active data forwarding and blocking policy of the CBG 104 taken during the race arbitration process is summarized in Table 1.

TABLE 1

| Pro-active forwarding and blocking policy | |
|---|---|
| A non-safety critical bus wins the race arbitration | Forwarding policy: forward the data to all buses<br>Blocking policy: block the data to no buses (no blocking) |
| A safety critical bus wins the race arbitration | Forwarding policy: forward the data to all buses except the bus or buses with an external node<br>Blocking policy: block the data to the bus or buses with an external node |

TABLE 1-continued

| Pro-active forwarding and blocking policy | |
|---|---|
| A bus with an external communications device wins the race arbitration | Forwarding policy: forward the data to all buses except the safety critical bus or buses<br>Blocking policy: block the data to the safety critical bus or buses |

As shown in the above table, if a non-safety critical bus wins the race arbitration for a particular time slot, the CBG 104 forwards received data from this non-safety critical bus to all other buses connected to the CBG 104 and does not block data from this non-safety critical bus to any other bus during the particular time slot. If a safety critical bus wins the race arbitration for a particular time slot, the CBG 104 forwards received data to all buses except the bus or buses with an external node and blocks the received data to the bus or buses with an external node during the particular time slot. If a bus with an external communications device wins the race arbitration for a particular time slot, the CBG 104 forward received data to all buses except the safety critical bus or buses and blocks the received data to the safety critical bus or buses during the particular time slot.

In the embodiment depicted in FIG. 1, the CBG 104 is configured to forward data (e.g., a data frame or data frames) from the bus of the winner of race arbitration to the bus 108-3 connected to the CBG 104 if each communications device connected to the bus of the winner of race arbitration only performs a non-critical (e.g., non safety critical) function. For example, if the bus 108-1 is the winner of race arbitration, the CBG 104 forwards data from a communications device 102-1 or 102-2 that is connected to the bus 108-1 to the bus 108-3 if each of the communications devices 102-1, 102-2 only performs a non-critical function and does not perform any critical (e.g., safety critical) function. In an embodiment, the CBG 104 is configured to block data (e.g., a data frame or data frames) from the bus of the winner of a race arbitration to the bus 108-3 connected to the CBG 104 if a communications device connected to the bus of the winner of a race arbitration performs a critical (e.g., safety critical) function. Because data is not forwarded from a bus that connects to a communications device performing a critical function to a bus that connects to the external network 114, the critical information is prevented from being exposed to the external world. For example, if the bus 108-1 is the winner of race arbitration, the CBG 104 blocks data from the communications device 102-1 or 102-2 to the bus 108-3 if at least one of the communications devices 102-1, 102-2 performs a critical function.

In the embodiment depicted in FIG. 1, the CBG 104 is configured to restrict data reception from the bus 108-3, which has a connection to the external network 114. In an embodiment, the CBG 104 is configured to forward scheduled data (e.g., a scheduled data frame or scheduled data frames) from the bus 108-3 connected to the CBG 104 to the specified destination bus of the CBG 104. In an embodiment, if the bus 108-3 is the winner of a race arbitration, the CBG 104 is configured to forward data (e.g., a data frame or data frames) from the bus 108-3 to a bus connected to the CBG 104 if each communications device connected to the receiving bus only performs a non-critical (e.g., non safety critical) function. For example, if the bus 108-3 is the winner of race arbitration and the bus 108-1 is the receiving bus, the CBG 104 forwards data from the bus 108-3 to a communications device 102-1 or 102-2 that is connected to the receiving bus 108-1 if each of the communications devices 102-1, 102-2 only performs a non-critical function and does not perform any critical (e.g., safety critical) function. In an embodiment, if the bus 108-3 is the winner of a race arbitration, the CBG 104 is configured to block data (e.g., a data frame or data frames) from the bus 108-3 to a bus connected to the CBG 104 if a communications device connected to the receiving bus performs a critical (e.g., safety critical) function. Because data is blocked from the bus 108-3 to a bus that connects to a communications device performing a critical (e.g., safety critical) function, wrong data or command is prevented from being propagated to a bus connected to the CBG 104 that is connected to a communications device performing a critical (e.g., safety critical) function. For example, if the bus 108-3 is the winner of race arbitration and the bus 108-1 is the receiving bus, the CBG 104 blocks data from the bus 108-3 to a communications device 102-1 or 102-2 that is connected to the receiving bus 108-1 if at least one of the communications devices 102-1, 102-2 performs a critical function.

In the embodiment depicted in FIG. 1, the CBG 104 does not necessarily know which of the buses 108-1, 108-2, 108-4 connected to the CBG 104 connects to a communications device 102-1, 102-2, 102-3, or 102-4 that performs a critical (e.g., safety critical) function. In an embodiment, the information of which of the buses connected to the CBG 104 connects to a communications device that performs a critical function is made available to the CBG via a configuration parameter, for example, by means of an implementation dependent configuration data. In another embodiment, the CBG 104 does not need the information of which of the buses connected to the CBG 104 connects to a communications device that performs a critical function. For example, the CBG 104 assumes that the buses 108-1, 108-2, 108-4 all connect to communications devices that perform critical functions.

The CBG 104 is configured to operate under a diagnostic mode in which the CBG 104 has full access rights to the communications network 100. In an embodiment, the data forwarding and receiving behaviors described above with respect to the bus 108-3, which has a connection to the external network 114, are default behaviors of the CBG 104. Under the diagnostic operational mode, the CBG 104 may override the data forwarding and receiving behaviors with respect to the bus 108-3 described above.

Figure 2:
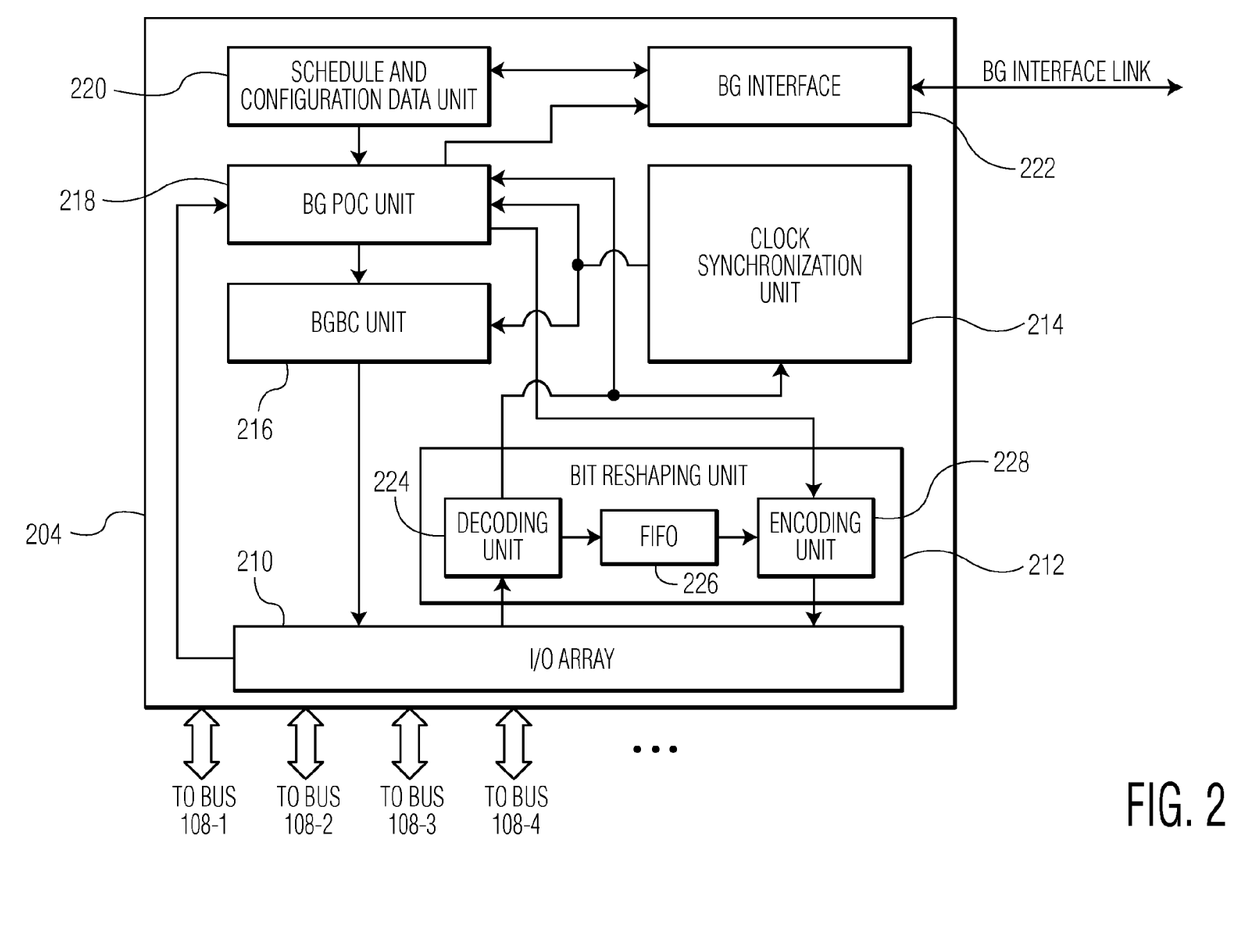
FIG. 2 depicts an embodiment of the CBG depicted in FIG. 1.

FIG. 2 depicts an embodiment of the CBG 104 of FIG. 1. In the embodiment depicted in FIG. 2, a CBG 204 includes an input/output (I/O) array 210, a bit reshaping unit 212, a clock synchronization unit 214, a bus guardian branch control (BGBC) unit 216, a bus guardian (BG) Protocol Operation Control (BG POC) unit 218, a schedule and configuration data unit 220 and a BG Interface 222. In addition, the CBG 204 is also connected to at least four buses 108-1, 108-2, 108-3, 108-4, which are connected to the I/O array 210. The CBG 204 may be a FlexRay-compatible CBG, which is designed, developed, manufactured, and/or configured compatibly with or in accordance to the FlexRay™ communications system specifications developed by the FlexRay™ Consortium. The CBG 204 is one of possible implementations of the CBG 104 that can be compatible with or in accordance with the FlexRay™ communications system specifications developed by the FlexRay™ Consortium. However, the CBG 104 can be implemented differently from the CBG 204 depicted in FIG. 2. The invention is not restricted to the particular implementation of the CBG 204 depicted in FIG. 2.

The I/O array 210 of the CBG 204 is configured to connect to all of the buses 108-1, 108-2, 108-3, 108-4 connected to the CBG 204. In an embodiment, incoming data (e.g., an incoming data frame) received by the I/O array from one bus connected to the CBG 204 is forwarded to the bit reshaping unit 212 before the incoming data is forwarded to the other buses connected to the CBG 204. If the CBG 204 allows race arbitration (i.e. no schedule based protection of the slots) in which the first incoming data frame from one bus will be delivered to all other buses, during the transmission of the first incoming data frame, no data frame from another bus can be received by the I/O array 210.

The bit reshaping unit 212 of the CBG 204 operates to ensure that, independent of the input signal quality, the output signal delivers the same decoding results for all receiving devices. If the decoded data (e.g., a decoded data frame) is correct, all non-faulty communications devices will receive the correct data. If the decoded data is incorrect, all non-faulty communications devices will receive the incorrect data. In an embodiment, the bit reshaping unit has the capability to invalidate data (e.g., data frames or data symbols) that is identified as faulty or almost faulty. The output stream of the bit reshaping unit is generated using the clock of the CBG 204.

In the embodiment depicted in FIG. 2, the bit reshaping unit 212 includes a decoding unit 224, a First in First out (FIFO) buffer 226 and an encoding unit 228. The decoding unit 224 of the bit reshaping unit 212 is configured to decode received data (e.g., a received data frame) from the I/O array 210 and to deliver the data and relevant timing and status information to the clock synchronization unit 214 and the BG POC unit 218. The status information contains the information on whether data was received, whether a startup or a sync data frame was received, and error information. In an embodiment, the decoding unit verifies the conformance of an incoming bit-stream to the coding rules and the general rules of communications elements. If the decoding unit finds an error in the incoming bitstream, the BG POC unit or other component of the CBG 204 may stop the current relay process and change (e.g., truncate or enlarge) the bit stream to invalidate the bitstream.

The FIFO buffer 226 of the bit reshaping unit 212 is configured to store data (e.g., data bits) that is transferred from the decoding unit 224 to the encoding unit 228. Because the clock of a data sender and the clock of the CBG 204 may run at slightly different speeds, the number of bits stored within the FIFO buffer can increase or decrease during data transmission (e.g., transmission of a data frame). The size of the FIFO buffer typically has to be twice the size that would be required for the nominal delay of the bit reshaping unit due to the possible increase or decrease of stored bits during forwarding of a data frame.

The encoding unit 228 of the bit reshaping unit 212 is configured to encode data and to deliver the encoded data (e.g., bitstream or symbols) to the I/O array 210. In an embodiment, the BG POC overrules data and forces the encoding unit to output an invalidated communications element. The regeneration of the bitstream may be based on the local sampling clock of the CBG 204. The encoding unit has no knowledge of the frame structure or encoding rules. Instead, the encoding unit may merely generate, on a bit-by-bit basis, the bit stream given to the encoding unit by the FIFO buffer 226. Due to possible clock deviations between a data sender and the CBG 204, the bit reshaping unit introduces an additional propagation delay, depending on maximal frame length and maximal relative clock deviation. The propagation delay can be reduced and the FIFO buffer minimized by allowing the encoding unit to compensate the clock speed difference, for example, by slightly varying the length of the high-bit in the byte start sequences of the data frame.

The clock synchronization unit 214 of the CBG 204 is configured to synchronize the CBG 204 to the global time.

Errors of the clock synchronization process are signaled from the clock synchronization unit to the BG POC unit 218. In an embodiment, the clock synchronization unit is basically identical to a clock synchronization unit in one of the communications devices 102-1, 102-2, 102-3, 102-4, 102-5, 102-6.

The BGBC unit 216 of the CBG 204 is configured to enforce a correct transmission schedule by opening the correct buses connected to the CBG 204 for transmission at the correct time. In an embodiment, the BGBC unit operates such that the CBG 204 behaves as an inactive device in which all of the buses are used for input and none of the buses is used to output. In another embodiment, the BGBC unit operates to forward data received from one of the buses to all other buses. In an embodiment, the BGBC unit uses a filtering mechanism to restrict the data forwarding and receiving behavior to/from a bus connected to the CBG 104 or 204 with an external connection described above.

The BG POC unit 218 of the CBG 204 is configured to handle the different states (e.g., startup and normal operation, etc.) of the CBG 204 and the transitions between the different states. In addition, the BG POC unit is also configured to enforce the schedule by sending the appropriate commands to the BGBC unit 216. All detected errors are stored by the BG POC unit and are made available to external devices through the BG Interface 222. The BG POC unit may have filtering capability. For example, if the decoding unit 224 finds an error in the incoming bitstream, the BG POC unit may stop the current relay process and truncate (or enlarge) the communications element to invalidate the communications element. Although the BGBC unit 216 and the BG POC unit 218 are depicted in FIG. 2, in some other embodiments, the CBG 204 includes a processing unit configured to perform the functions of the BGBC unit and the BG POC unit.

The schedule and configuration data unit 220 of the CBG 204 is configured to receive communications configuration data, which may include a communications schedule of the CBG 204 and/or configuration parameters for the CBG 204. In an embodiment, the schedule and configuration data unit stores the communications schedule (or at least the parts that need to be protected) and all necessary configuration data and to make the stored information available to the BG POC unit 218. The integrity of the communications schedule and configuration data can be protected by an error-detecting code (e.g., a CRC) that is checked periodically. Mismatches between the data and the signature may cause the CBG 204 to transit into a state in which no communications elements are forwarded or all communications elements are forwarded.

The BG Interface 222 of the CBG 204 is a connection device that allows an external computing unit (e.g., a central processing unit (CPU)) to perform certain operations involving the CBG 204. In an embodiment, the BG Interface is connected to a BG interface link and provides the possibility for an external device to update the communications schedule and configuration data of the CBG 204. The BG interface also allows error messages, status information and configuration data to be read out of the CBG 204.

In an exemplary operation of the CBG 204 depicted in FIG. 2, a data unit of the CBG 204, which may be the schedule and configuration data unit 220, receives communications configuration data. A processing unit of the CBG 204, which may include the BGBC unit 216 and/or the BG POC unit 218, performs functions similar to or same as the forwarding and blocking functions of the CBG 104.

Figure 3:
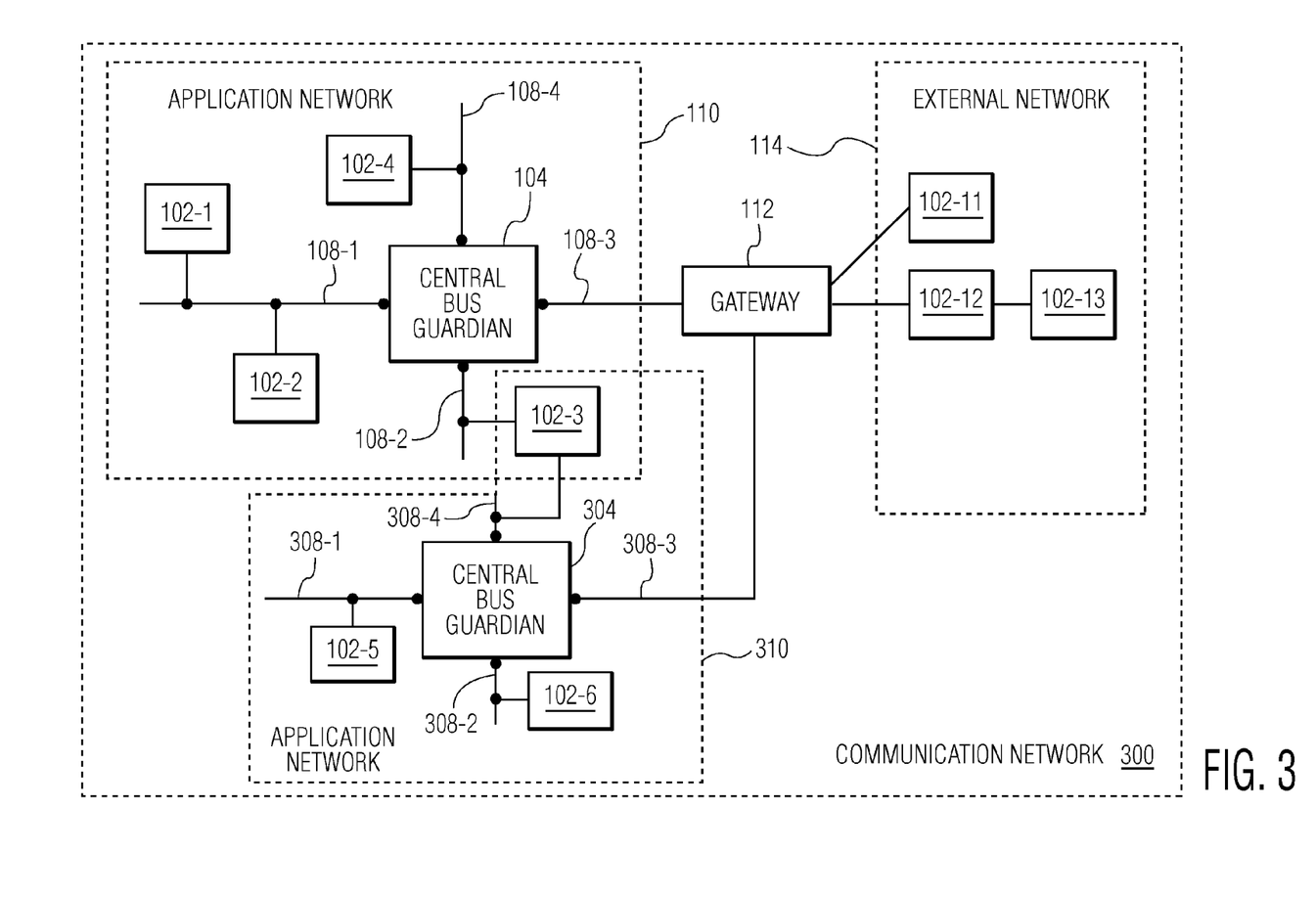
FIG. 3 is a schematic block diagram of a communications network that includes multiple application networks in accordance with another embodiment of the invention.

Although the communications network 100 is depicted in FIG. 1 as including one application network 110, in some other embodiments, the communications network includes multiple application networks. FIG. 3 is a schematic block diagram of a communications network that includes multiple application networks 110, 310 in accordance with another embodiment of the invention. In the embodiment depicted in FIG. 3, a communications network 300 includes the application networks 110, 310, the gateway 112 and the external network 114.

The application network 310 performs same or similar functions as the application network 110 depicted in FIG. 1. In the embodiment depicted in FIG. 3, the application network 310 includes communications devices 102-3, 102-5, 102-6 and a CBG 304. The application network 310 shares the communications device 102-3 with the application network 110. Although the application network 310 is shown in FIG. 3 as including three communications devices, in some other embodiments, the application network 310 includes more than three communications devices or less than three communications devices. Although the application network 310 is shown in FIG. 3 as including only one CBG 304, in some other embodiments, the application network 310 includes multiple CBGs.

The communications devices 102-3, 102-5, 102-6 of the application network 310 are configured to transmit and receive data. In addition to communications, each of the communications devices may be configured to perform an additional function. For example, each of the communications devices may be used to perform an automotive application. The data transmitted and received by the communications devices can be in any suitable format. In an embodiment, the data transmitted and received are data frames. In an embodiment, the communications devices are electronic controller nodes in an automobile system.

The CBG 304 of the application network 310 performs same or similar functions as the CBG 104 of the application network 110. Specifically, the CBG 304 is configured to selectively block and selectively forward data received on buses connected to the CBG 304. In the embodiment depicted in FIG. 3, the CBG 304 is connected to four buses 308-1, 308-2, 308-3, 308-4 in the application network 310. The four buses 308-1, 308-2, 308-3, 308-4 are buses in the application network 310. In an embodiment, the four buses 308-1, 308-2, 308-3, 308-4 are serial communications buses in the application network 310. Specifically, the communications device 102-5 is connected to the bus 308-1, the communications device 102-6 is connected to the bus 308-2, the gateway 112 is connected to the bus 308-3, and the communications device 102-3 is connected to the bus 308-4. The communications device 102-3 is also connected to the bus 108-2 connected to the CBG 104. Although the CBG 304 is shown in FIG. 3 as being connected to four buses, in some other embodiments, the CBG 304 is connected to more than four buses or less than four buses. In an embodiment, at least one of the communications devices 102-3, 102-5, 102-6 is directly connected to a bus, which is connected to the CBG 304. In other words, at least one of the communications devices 102-3, 102-5, 102-6 is connected to a bus, which is connected to the CBG 304, without any intermediate device.

In an embodiment, all of the communications devices 102-1, 102-2, 102-3, 102-4, 102-5, 102-6 in each of the application networks 110, 310 are communications nodes of a FlexRay™ communications system in accordance to the FlexRay™ communications system specifications developed by the FlexRay™ Consortium. In this embodiment, the CBG 104 is connected to a first channel of the FlexRay™ communications system to enable data transfer on the first channel and to increase fault tolerance of the first channel and the CBG 304 is connected to a second channel of the FlexRay™ communications system to enable data transfer on the second channel and to increase fault tolerance of the second channel.

Figure 4:
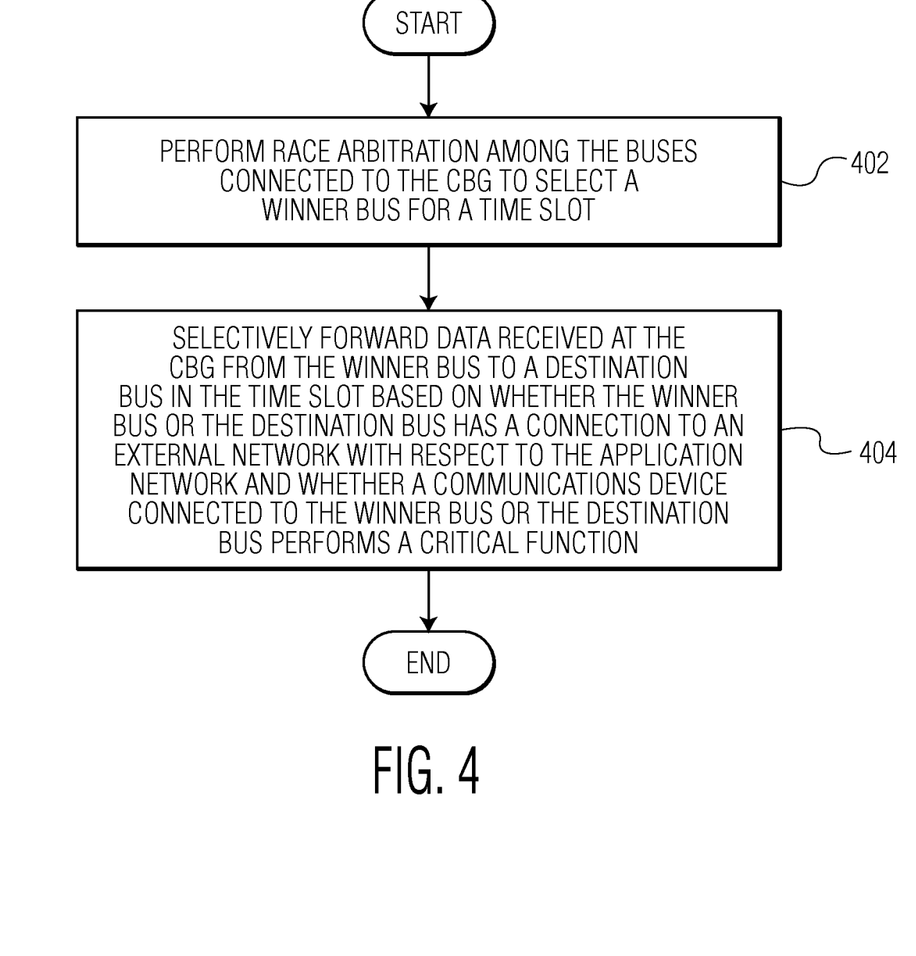
FIG. 4 is a process flow diagram of a method for operating a CBG in accordance with an embodiment of the invention.

FIG. 4 is a process flow diagram of a method for operating a CBG in accordance with an embodiment of the invention. The CBG may be similar to or same as the CBGs 104, 204, 304 depicted in FIGS. 1, 2 and 3. The CBG is connected to buses in an application network. For some communications time slots, the sender bus (i.e., the bus via which a sender device is connected to the CBG) may be specified in the communications schedule. However, for some other communications time slots, the sender bus may not be specified in the communications schedule. If the sender bus is specified in the communications schedule, the CBG performs a strict arbitration such that the data from the specified sender bus is forwarded to the specified destination bus or buses. If the sender bus is not specified in the communications schedule, the CBG performs a race arbitration among the available buses to select the bus that first begins to send data as the winner of the race arbitration of the particular time slot. At block 402, race arbitration is performed among the buses connected to the CBG to select a winner bus for a time slot. At block 404, data received at the CBG from the winner bus to a destination bus is forwarded or blocked in the time slot based on whether or not the winner bus or the destination bus has a connection to an external network with respect to the application network and/or whether or not a communications device connected to the winner bus or the destination bus performs a critical function.

The various components or units of the embodiments that have been described or depicted (e.g., the CBGs 104, 204, 304 and the communications devices 102-1, 102-2, 102-3, 102-4, 102-5, 102-6, 102-11, 102-12, 102-13) may be implemented in hardware, software that is stored in a non-transitory computer readable medium or a combination of hardware and software that is stored in a non-transitory computer readable medium. The non-transitory computer readable medium can be an electronic, magnetic, optical, electromagnetic, infrared, or semiconductor system (or apparatus or device), or a propagation medium. Examples of a non-transitory computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), a digital video disk (DVD), and a Blu-ray disk. Furthermore, the various components or units of the embodiments (e.g., the CBGs 104, 204, 304 and the communications devices 102-1, 102-2, 102-3, 102-4, 102-5, 102-6, 102-11, 102-12, 102-13) that have been described or depicted may be implemented in a processor, which may include a multifunction processor and/or an application-specific processor.

Although embodiments of the invention are described with respect to CBGs, embodiments of the invention are not restricted to CBGs. For example, embodiments of the invention can used in communications controllers, such as switches.

Although the operations of the method herein are shown and described in a particular order, the order of the operations of the method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

In addition, although specific embodiments of the invention that have been described or depicted include several components described or depicted herein, other embodiments of the invention may include fewer or more components to implement less or more feature.

Furthermore, although specific embodiments of the invention have been described and depicted, the invention is not to be limited to the specific forms or arrangements of parts so described and depicted. The scope of the invention is to be defined by the claims appended hereto and their equivalents.

What is claimed is:

1. A method for operating a central bus guardian (CBG), the CBG being connected to buses in an application network, the method comprising:
    performing race arbitration among the buses connected to the CBG to select a winner bus for a time slot; and
    selectively forwarding data received at the CBG from the winner bus to a destination bus in the time slot based on whether the winner bus or the destination bus has a connection to an external network with respect to the application network and whether a communications device connected to the winner bus or the destination bus performs a critical function, wherein the selectively forwarding includes forwarding the data from the winner bus to the destination bus in the time slot if each communications device connected to the winner bus only performs a non-critical function.

2. The method of claim 1, wherein the selectively forwarding the data received at the CBG from the winner bus to the destination bus in the time slot comprises forwarding the data from the winner bus to the destination bus in the time slot if each communications device connected to the winner bus only performs a non-critical function regardless of whether or not the destination bus has a connection to an external network with respect to the application network.

3. The method of claim 1, wherein the selectively forwarding the data received at the CBG from the winner bus to the destination bus in the time slot comprises forwarding the data from the winner bus to the destination bus in the time slot if the destination bus does not have a connection to the external network and if a communications device connected to the winner bus performs a critical function.

4. The method of claim 1, wherein the selectively forwarding the data received at the CBG from the winner bus to the destination bus in the time slot comprises blocking the data from the winner bus to the destination bus in the time slot if the destination bus has a connection to the external network and if a communications device connected to the winner bus performs a critical function.

5. The method of claim 1, wherein the selectively forwarding the data received at the CBG from the winner bus to the destination bus in the time slot comprises forwarding the data from the winner bus to the destination bus in the time slot if the winner bus has a connection to the external network and if each communications device connected to the destination bus only performs a non-critical function.

6. The method of claim 1, wherein the selectively forwarding the data received at the CBG from the winner bus to the destination bus in the time slot comprises blocking the data from the winner bus to the destination bus in the time slot if the winner bus has a connection to the external network and if a communications device connected to the destination bus performs a critical function.

7. The method of claim 1 further comprises:
    operating the CBG in the diagnostic operational mode; and
    in the diagnostic operational mode, forwarding data received at the CBG from the winner bus to the destination bus in the time slot regardless of whether or not the winner bus or the destination bus has a connection to an external network with respect to the application network and/or whether or not a communications device connected to the winner bus or the destination bus performs a critical function.

8. A central bus guardian (CBG) comprising:
an input/output (I/O) unit connected to buses in an application network; and
a processing unit configured to perform race arbitration among the buses connected to the CBG to select a winner bus for a time slot, the processing unit being further configured to selectively forward data received at the CBG from the winner bus to a destination bus in the time slot based on whether the winner bus or the destination bus has a connection to an external network with respect to the application network and whether a communications device connected to the winner bus or the destination bus performs a critical function, wherein the processing unit is further configured to forward the data from the winner bus to the destination bus in the time slot if each communications device connected to the winner bus only performs a non-critical function regardless of whether or not the destination bus has a connection to an external network with respect to the application network.

9. The CBG of claim 8, wherein the processing unit is further configured to:
forward the data from the winner bus to the destination bus in the time slot
if the destination bus does not have a connection to the external network and if a communications device connected to the winner bus performs a critical function or
if the winner bus has a connection to the external network and if each communications device connected to the destination bus only performs a non-critical function;
block the data from the winner bus to the destination bus in the time slot
if the destination bus has a connection to the external network and if a communications device connected to the winner bus performs a critical function or
if the winner bus has a connection to the external network and if a communications device connected to the destination bus performs a critical function.

10. The CBG of claim 8, wherein the processing unit is further configured to:
operate the CBG in the diagnostic operational mode; and
in the diagnostic operational mode, forward data received at the CBG from the winner bus to the destination bus in the time slot regardless of whether or not the winner bus or the destination bus has a connection to an external network with respect to the application network and/or whether or not a communications device connected to the winner bus or the destination bus performs a critical function.

11. A method for operating a FlexRay-compatible central bus guardian (CBG), the FlexRay-compatible CBG being connected to buses in an application network, the method comprising:
performing race arbitration among the buses connected to the FlexRay-compatible CBG to select a winner bus for a time slot; and
selectively forwarding data received at the FlexRay-compatible CBG from the winner bus to a destination bus in the time slot based on whether the winner bus or the destination bus has a connection to an external network with respect to the application network and whether a communications device connected to the winner bus or the destination bus performs a critical function, wherein the forwarding or blocking the data received at the FlexRay-compatible CBG from the winner bus to the destination bus in the time slot comprises forwarding the data from the winner bus to the destination bus in the time slot if each communications device connected to the winner bus only performs a non-critical function.

12. The method of claim 11, wherein the forwarding or blocking the data received at the FlexRay-compatible CBG from the winner bus to the destination bus in the time slot comprises forwarding the data from the winner bus to the destination bus in the time slot if each communications device connected to the winner bus only performs a non-critical function regardless of whether or not the destination bus has a connection to an external network with respect to the application network.

13. The method of claim 11, wherein the forwarding or blocking the data received at the FlexRay-compatible CBG from the winner bus to the destination bus in the time slot comprises forwarding the data from the winner bus to the destination bus in the time slot if the destination bus does not have a connection to the external network and if a communications device connected to the winner bus performs a critical function.

14. The method of claim 11, wherein the forwarding or blocking the data received at the FlexRay-compatible CBG from the winner bus to the destination bus in the time slot comprises blocking the data from the winner bus to the destination bus in the time slot if the destination bus has a connection to the external network and if a communications device connected to the winner bus performs a critical function.

15. The method of claim 11, wherein the forwarding or blocking the data received at the FlexRay-compatible CBG from the winner bus to the destination bus in the time slot comprises forwarding the data from the winner bus to the destination bus in the time slot if the winner bus has a connection to the external network and if each communications device connected to the destination bus only performs a non-critical function.

16. The method of claim 11, wherein the forwarding or blocking the data received at the FlexRay-compatible CBG from the winner bus to the destination bus in the time slot comprises blocking the data from the winner bus to the destination bus in the time slot if the winner bus has a connection to the external network and if a communications device connected to the destination bus performs a critical function.

17. The method of claim 11 further comprises:
operating the FlexRay-compatible CBG in the diagnostic operational mode; and
in the diagnostic operational mode, forwarding data received at the FlexRay-compatible CBG from the winner bus to the destination bus in the time slot regardless of whether or not the winner bus or the destination bus has a connection to an external network with respect to the application network and/or whether or not a communications device connected to the winner bus or the destination bus performs a critical function.

* * * * *